United States Patent [19]
Tanaka et al.

[11] Patent Number: 6,033,785
[45] Date of Patent: Mar. 7, 2000

[54] VEHICULAR COLORED GLASS PANE WITH LIGHT TRANSMITTANCE AND REFLECTANCE ADJUSTMENT

[75] Inventors: Katsuto Tanaka; Osamu Miyazaki; Motoharu Inoue, all of Mie, Japan

[73] Assignee: Central Glass Company, Limited, Yamaguchi, Japan

[21] Appl. No.: 08/899,703

[22] Filed: Jul. 24, 1997

[30] Foreign Application Priority Data

Jul. 29, 1996 [JP] Japan .................................. 8-198876
Jul. 15, 1997 [JP] Japan .................................. 9-189914

[51] Int. Cl.$^7$ ...................................................... B32B 17/00
[52] U.S. Cl. ........................... 428/426; 428/428; 428/432
[58] Field of Search ..................... 428/426, 428, 428/432

[56] References Cited

U.S. PATENT DOCUMENTS 4,323,598  4/1982  Okino ...................................... 427/160

FOREIGN PATENT DOCUMENTS 64-63419  3/1989  Japan .
6-80441  3/1994  Japan .
6-321580  11/1994  Japan .
7-25647  1/1995  Japan .
8-268732  10/1996  Japan .

*Primary Examiner*—Timothy M. Speer
*Attorney, Agent, or Firm*—Evenson, McKeown, Edwards & Lenahan, P.L.L.C.

[57] ABSTRACT

The invention relates to a vehicular glass pane having inner and outer major surfaces which are respectively disposed on a first side of a vehicular interior and a second side of a vehicular exterior. The glass pane has a glass plate and a multilayered film formed on one of the inner and outer major surfaces of the glass plate. The glass plate contains a coloring agent. The multilayered film includes a first layer which is light-absorbent and a second layer which is non-light-absorbent. The glass plate and the multilayered film are such that a visible light transmittance of the glass pane is from 25 to 55%, that a first reflectance of the inner major surface of the glass pane is up to 15%, that a second reflectance of the outer major surface of the glass pane is from 10 to 40%, that the visible light transmittance minus the first reflectance is at least 15%, and that the visible light transmittance minus the second reflectance is up to 30%. The glass pane is capable of sufficiently maintaining the vehicular occupants' privacy therethrough and the outward visibility therethrough from the vehicular interior, under various conditions.

14 Claims, No Drawings

VEHICULAR COLORED GLASS PANE WITH LIGHT TRANSMITTANCE AND REFLECTANCE ADJUSTMENT

BACKGROUND OF THE INVENTION

The present invention relates to an vehicular colored glass pane, of which light transmittance and reflectance are adjusted. Such glass pane is intended to maintain the privacy of vehicular occupants (driver and passengers) therethrough and the outward visibility therethrough from the vehicular interior.

Hitherto, there have been proposals of using dark-colored glass plates for automotive side and rear windows or of attaching dark-colored films to glass plates of those windows, for the purpose of maintaining the privacy of automotive rear passengers. According to these proposals, it is necessary to adjust the visible light transmittance of those windows within about 20% for sufficiently achieving this purpose.

There are further proposals of coating colored glass plates with reflective films. The reflected light from such glass plate interferes with the inward visibility toward the vehicular interior from the outside. The visible light transmittance of such glass plate can be higher than those of the above dark-colored glass plates and those of the above glass plates having dark-colored films. However, when a vehicular interior light is switched on, there is increased the reflection from the inner surface of the glass plate having a reflective film thereon. Due to this, the outward visibility from the vehicular interior is obstructed.

Japanese Patent Unexamined Publication JP-A-64-63419 discloses an automotive window glass pane having a transparent outer glass plate, a heat reflective film formed on the inner surface of the glass plate, and a transparent protective layer covering the heat reflective film. It is disclosed therein that such glass pane of Example 1 had an average visible light transmittance of 2.1% and an average visible light reflectance of 17.1%.

JP-A-6-80441 discloses a glass article having a glass substrate, a metal layer formed on the glass substrate, another layer covering the metal layer, and a protective metal oxide covering the another layer. The metal layer is made of nickel or a high-nickel-content alloy. The another layer is made of metal silicon or an oxide of nickel or of a high-nickel-content alloy. The protective metal oxide may be a stoichiometric $SnO_2$. It is disclosed therein that such glass article according to Example 1 had a visible light transmittance of 22–23% and a visible light reflectance of the uncoated side of 11–12%, and a visible light reflectance of the coated side of 31–33%.

JP-A-6-321580 discloses an abrasion-resistant low-transmittance glass plate having a glass substrate, a heat shielding film formed on the glass plate, a first transparent protective film formed on the heat shielding film, and a second transparent protective film formed on the first film. It is disclosed therein that the glass plate has a visible light transmittance of up to 40% and a visible light reflectance of the uncoated side of up to 30%.

JP-A-7-25647 discloses a heat shielding glass plate having a transparent glass substrate and a laminate of first, second and third layers, formed on the glass substrate. The first layer is made of at least one selected from Fe-Cr-Ni alloys, Ni—Cr alloys, Ti metal and Cr metal. The second layer is made of titanium dioxide or chromic oxide. The third layer is a transparent film having a thickness of 40–100 nm and having a refractive index of up to 1.8. The glass plate has a visible light reflectance of the uncoated side of at least 25%, a visible light reflectance of the coated side, which is lower than that of the glass substrate itself, and a visible light transmittance of 30–50%.

JP-A-8-268732, having a publication date of Oct. 15, 1996, discloses a heat reflective glass plate having a glass substrate, a heat reflective first film formed on the glass substrate, and a second film formed on the first film. The first film has a first refractive index of 2.0–3.5, a first extinction coefficient of 0.2–1.5 and a first thickness of 20–80 nm. The second film has a second refractive index which is lower than the first refractive index and is of 1.6–2.3, a second extinction coefficient of up to 0.03, and a second thickness of 10–100 nm.

SUMMARY OF THE INVENTION

It is therefore an object of the present invention to provide a vehicular glass pane which is capable of sufficiently maintaining the occupants' privacy therethrough and the outward visibility therethrough from the vehicular interior.

According to the present invention, there is provided a vehicular glass pane having inner and outer major surfaces which are respectively disposed on a first side of a vehicular interior and a second side of a vehicular exterior. The glass pane has a glass plate containing a coloring agent and having inner and outer major surfaces which are respectively disposed on the first and second sides; and a multilayered film formed on one of the inner and outer major surfaces of the glass plate. The multilayered film includes a first layer which is light-absorbent and a second layer which is non-light-absorbent. The glass plate and the multilayered film are such that a visible light transmittance of the glass pane is from 25 to 55%, that a first reflectance of the inner major surface of the glass pane is up to 15%, that a second reflectance of the outer major surface of the glass pane is from 10 to 40%, that the visible light transmittance minus the first reflectance is at least 15%, and that the visible light transmittance minus the second reflectance is up to 30%.

According to the present invention, as stated above, the first reflectance of the inner major surface of the glass pane is much reduced, while the second reflectance of the outer major surface of the glass pane is not reduced so much. Thus, the glass pane is capable of sufficiently maintaining the vehicular occupants' privacy therethrough and the outward visibility therethrough from the vehicular interior, under various conditions.

DESCRIPTION OF THE PREFERRED EMBODIMENTS

As stated above, the glass plate and the multilayered film of the vehicular glass pane of the present invention are such that a visible light transmittance of the glass pane is from 25 to 55%, that a first reflectance of the inner major surface of the glass pane is up to 15%, preferably up to 10%, that a second reflectance of the outer major surface of the glass pane is from 10 to 40%, preferably from 10 to 30%, that the visible light transmittance minus the first reflectance is at least 15%, preferably at least 20%, and that the visible light transmittance minus the second reflectance is up to 30%, preferably up to 15%. If the visible light transmittance is lower than 25%, the outward visibility through the glass pane from the vehicular interior is obstructed in the night, irrespective of the values of the first and second reflectances. If the visible light transmittance is higher than 55%, the inward visibility through the glass pane from the vehicular exterior becomes too much, even in a relatively bright urban area in the night, having a illumination of about 100 lx. When the visible light transmittance minus the first reflectance is at least 15%, the outward visibility therefrom becomes substantially satisfactory. In other words, even when the first reflectance is relatively high within a range of up to 15%, the outward visibility is well maintained in case that the visible light transmittance is high. If the first reflectance is higher than 15%, the outward visibility is obstructed by the visible light reflected from the inner major surface of the glass pane, for example, in case that a vehicular interior light is in a state of switch-on, or that the vehicular interior is lightened by another vehicle running in the opposite direction. The first reflectance does not have a particular lower limit, but is preferably at least 2%. If it is too low, the first reflectance may become high with respect to the short and long wavelength ends of the visible light region. In a preferred embodiment of the present invention, the vehicular glass pane may satisfy each of conditions that the first reflectance is from 3 to 15%, that the second reflectance is from 15 to 40%, that the visible light transmittance minus the second reflectance is up to 15%, and that a light reflected from the inner major surface of the glass pane has an excitation purity of from 4 to 20%. If the second reflectance is lower than 10%, the reflection of the vehicular exterior's image from the glass pane is not sufficient. With this, the inward visibility through the glass pane from the vehicular exterior becomes too much. If the second reflectance is higher than 40%, the sunshine reflection becomes too strong. This interferes with the driving of other neighboring vehicles.

A vehicular glass pane according to the present invention may be prepared by forming, on a colored glass plate having a visible light transmittance of about 80%, a multilayered film including a light-absorbent layer made of, for example, CoOx, and a non-light-absorbent layer, that is, a transparent layer having a suitable refractive index. The light-absorbent layer has an extinction coefficient of from about 0.2 to about 1.5, and in contrast the non-light-absorbent layer has an extinction coefficient of up to about 0.03.

In the invention, the first layer may be made of at least one selected from CoOx, $Fe_2O_3$, $Cr_2O_3$, NiO, TiN, ZrN, TaN, and mixtures of at least two of these compounds. The first layer made of CoOx can be prepared, for example, by a first or second method. The first method comprises sequential steps of (a) dissolving a cobalt-containing organic compound (e.g., $Co(C_5H_7O_2)_3$) in an organic solvent (e.g., $CH_2Cl_2$) to prepare a cobalt-containing solution; and (b) spraying the cobalt-containing solution onto a major surface of the glass plate having a temperature of about 600° C., which has just come out from the tin bath on the float glass production line. The second method comprises sequential steps of (a) heating the cobalt-containing compound to about 200° C. in a stream of nitrogen gas to evaporate this compound; and (b) blowing the compound together with oxygen onto the glass plate heated as mentioned above.

In the invention, the second transparent layer, which is not light-absorbent, may be made of at least one selected from $SiO_2$, $Al_2O_3$, $TiO_2$, $SnO_2$, $ZrO_2$, and mixtures of at least two of these compounds, to have a suitable refractive index. The second layer made of $SiO_2$ can be prepared, for example, by a method comprising sequential steps of (a) heating a silicon-containing compound (e.g., $Si(C_2H_5O)_4$) to about 200° C. in a stream of nitrogen gas to evaporate this compound; and (b) blowing the compound together with oxygen onto the glass plate heated as mentioned above. In this step (b), it becomes possible to increase the rate of the formation of the second layer by blowing the compound together with $P(CH_3)_3$, ozone and/or the like. The second layer made of $TiO_2$ can be prepared, for example, by a first or second method. The first method comprises sequential steps of (a) dissolving a titanium-containing organic compound (e.g., $Ti(C_3H_7O)_2(C_5H_7O_2)_2$) in a solvent to prepare a titanium-containing solution; and (b) spraying the titanium-containing solution onto the glass plate heated as mentioned above. The second method comprises sequential steps of (a) heating the titanium-containing compound to a temperature of from about 100 to about 200° C. in a stream of nitrogen gas; and (b) blowing the compound together with oxygen onto the glass plate heated as mentioned above.

In a first case of the invention, the light-absorbent first layer can be formed on the inner major surface of the glass plate, which is disposed on the vehicular interior side. In this case, the reflectance of the coated side of the glass plate can be decreased by forming on the first layer a transparent layer (i.e., the non-light-absorbent second layer) having a refractive index which is lower than that of the first layer. With this, the second layer is interposed between the first layer and vehicular interior's air. Therefore, the light reflectance of the inner major surface of the obtained glass pane according to the first case of the invention becomes much lower than that of a glass pane, not according to the invention, having a light-absorbent layer which is in a direct contact with the vehicular interior's air. The latter glass pane has a high inward reflection from the interface between the light-absorbent layer and the vehicular interior's air. In the first case, the reflectance of the inner major surface of the glass pane can be lowered effectively by adjusting the thickness of the second layer to satisfy the following equation:

$$n_2 \times d_2 \times 4 = \lambda,$$

where $n_2$ is the refractive index of the second layer, $d_2$ is the thickness of the second layer, and $\lambda$ is a visible light wavelength of from 500 to 550 nm. The human eye is the most sensitive to a visible light having this wavelength.

In a second case of the invention, the light-absorbent first layer can be formed on the outer major surface of the glass plate, which is disposed on the vehicular exterior side. In this case, the reflectance of the uncoated side of the glass plate can be decreased by interposing between the glass plate and the first layer a transparent layer (i.e., the second layer) having a refractive index which is intermediate between those of the glass plate and the first layer. This decrease of the reflectance becomes greater, and the light reflected from the inner major surface of the glass pane will have an excitation purity which is not too high, by using a glass plate containing a coloring agent, as in the invention. It is needless to say that the light reflected from the inner major surface of the glass pane becomes more neutral in color tone by forming therebetween a plurality of the second layer, as compared with the formation of only one of the second layer. The light reflectance of the major inner surface of the glass pane according to the second case of the invention becomes much lower than that of a glass pane, not according to the invention, having a light-absorbent layer which is directly formed on the major outer surface of its glass plate. The latter glass pane has a high inward reflection from the interface between the light-absorbent layer and the glass plate.

In either of the above-mentioned first and second cases of the present invention, the glass plate may be a vehicular green glass plate having a visible light transmittance of about 80%, and the first layer may be made of a mixture of CoO and $Cr_2O_3$. With this, the glass plate coated with the first layer may have a visible light transmittance of about 25%, a reflectance of the inner major surface of this coated glass plate of about 36% and a reflectance of the outer major surface thereof of about 24%, and the first layer may have a refractive index of about 2.7 and an extinction coefficient of about 0.6.

In the invention, the glass plate is a transparent colored glass plate used for vehicular windows. This glass plate may be a float glass plate having a color of blue, gold, bronze, gray, green or the like. It is preferable that the glass plate has a visible light transmittance of about 80% and a color of blue, gold or green. It is further preferable that the glass plate has a green color and is heat- and ultraviolet-absorbent. Furthermore, the glass plate may be a single glass plate, an ultraviolet- and heat-shielding glass plate, a laminated glass plate, a double glazing unit, or a tempered glass plate. The glass plate may be a transparent organic glass plate, too.

The following nonlimitative examples are illustrative of the present invention.

EXAMPLE 1

In this example, a glass pane having a two-layered film on the vehicular interior side was prepared as follows. At first, a vehicular green-colored float glass plate, having widths of about 100 mm, a thickness of 3.5 mm and a visible light transmittance of about 80%, was heated to about 600° C. by an electric heater. Separately, a cobalt-containing solution was prepared by dissolving 10 g of cobalt acetylacetonato $(CO(C_5H_7O_2)_3)$ in 100 g of methylene chloride $(CH_2Cl_2)$. Then, the total amount of the cobalt-containing solution was sprayed by spending about 40 seconds onto a major surface of the heated glass plate, thereby to form a cobalt oxide thin layer (light-absorbent first layer) thereon by pyrolysis method. The cobalt oxide layer was found to have a thickness of about 40 nm and a refractive index of about 2.78 by the measurement with an ellipsometer of Mizojiri Kogaku Co. and further found to have an extinction coefficient of about 0.64. The glass plate coated with the cobalt oxide layer was subjected to the optical characteristic measurement to determine the visible light transmittance Tv (380–780 nm), the visible light reflectance Rv (380–780 nm), the excitation purity of color tone and the solar radiation transmittance Ts (340–1800 nm), using U-4000-type Spectrophotometer of Hitachi Ltd., with respect to wavelengths of from 340 to 1,800 nm, in accordance with Japanese Industrial Standard (JIS) Z 8722, JIS R 3106 and JIS Z8701, each of which is incorporated herein by reference in its entirety. With this measurement, the coated glass plate was found to have a visible light transmittance (Tv) of about 23.3%, a visible light reflectance (Rvf) of the coated side of about 38.6%, an excitation purity (Pef) of the visible light reflected from the coated side of about 4.5%, a visible light reflectance (Rvg) of the uncoated side of about 25.0%, and a solar radiation transmittance of about 29.8%.

Separately, an aluminum-containing solution was prepared by dissolving 8 g of aluminum acetylacetonato (Al $(C_5H_7O_2)_3$) in 100 g of methylene chloride $(CH_2Cl_2)$. Then, the aluminum-containing solution was sprayed onto the cobalt oxide layer, thereby to form thereon an aluminum oxide layer (non-light-absorbent second layer) by pyrolysis method. The aluminum oxide layer was found to have a thickness of about 70 nm and a refractive index of about 1.60 by the same measurement as above, and further was found to have an extinction coefficient of up to about 0.03.

The glass plate coated with the two-layered film was subjected to the same optical characteristic measurement as above. By this measurement, this coated glass plate was found to have a solar radiation transmittance of from about 35 to about 38%, and the other results are shown in Table. The coated glass plate (glass pane) was found to have a reflected light having a pale blue color.

The glass pane, having the two-layered film, was evaluated with respect to the inward visibility therethrough toward the vehicular interior from the outside. The result of this evaluation is shown in Table. Regarding the results of this evaluation in Table, "A" means that the inward visibility therethrough was in an extent to sufficiently maintain the aimed privacy for vehicular occupants; "B" means that it was in an extent to almost maintain that; and "C" means that it was not in an extent to sufficiently maintain that.

The glass pane was further evaluated with respect to the outward visibility therethrough from the vehicular interior toward the outside. The result of this evaluation is shown in Table. Regarding the results of this evaluation in Table, "A" means that the outward visibility therethrough was sufficiently high; "B" means that it was almost high; and "C" means that it was not high.

Furthermore, the glass pane was subjected to the surface resistivity measurement, using a surface resistivity meter (HIRESTA HT-210 (trade name) of Mitsubishi Petrochemical Co., Ltd. (Mitsubishi Yuka)). By this measurement, it was found to have a sufficiently high surface resistivity. This means that its radio transmissivity was sufficient.

The glass pane was further subjected to durability tests including Taber test to evaluate abrasion resistance, in accordance with JIS K 6714, JIS R 3221 and JIS R 3212, each of which is incorporated herein by reference in its entirety. All of the results of these durability tests were satisfactory.

TABLE

| | TV* (%) | Rin* (%) | Rout* (%) | Tv - Rout (%) | Tv - Rin (%) | Inward Visibility | Outward Visibility |
|---|---|---|---|---|---|---|---|
| Ex. 1 | 34.5 | 10.0 | 14.6 | 19.9 | 24.5 | A | A |
| Ex. 2 | 36.3 | 10.6 | 12.6 | 23.7 | 25.7 | A | A |
| Ex. 3 | 34.7 | 8.0 | 13.0 | 21.7 | 26.7 | A | A |
| Ex. 4 | 35.4 | 3.7 | 10.5 | 24.9 | 31.7 | A | A |
| Ex. 5 | 32.0 | 7.1 | 23.9 | 8.1 | 24.9 | A | A |
| Com. Ex. 1 | 23.2 | 38.8 | 24.8 | −1.6 | −15.6 | A | C |
| Com. Ex. 2 | 23.0 | 2.1 | 4.9 | 18.1 | 20.9 | B | C |
| Com. Ex. 3 | 57.0 | 4.5 | 4.6 | 52.4 | 52.5 | C | A |
| Com. Ex. 4 | 40.3 | 3.8 | 4.5 | 35.8 | 36.5 | C | A |

*TV: visible light transmittance of glass pane, Rin: visible light reflectance of the inner major surface of glass pane, and Rout: visible light reflectance of the outer major surface of glass pane.

EXAMPLE 2

In this example, a glass pane similar to that of Example 1 was prepared, as follows. At first, a cobalt-containing solution was prepared by dissolving 100 g of cobalt acetylacetonato $(Co(C_5H_7O_2)_3)$ in 1 liter of methylene chloride $(CH_2Cl_2)$. Then, this cobalt-containing solution was sprayed at a rate of about 2,500 g/min onto a vehicular green-colored float glass plate NF14 which had just come out under a heated condition from a tin bath of the production line, thereby to form thereon a cobalt oxide thin layer by pyrolysis method. The glass plate had a width of about 3.5 m and a thickness of 4.0 mm. The thus coated glass plate was found by the same measurement as that of Example 1 to have a thickness of about 42 nm and a refractive index of about 2.80 and further was found to have an extinction coefficient of about 0.65. This coated glass plate was subjected to the same optical characteristics measurement as that of Example 1. By this measurement, the coated glass plate was found to have a visible light transmittance of about 23.2%, a visible light reflectance of the coated side of about 38.8%, an excitation purity of the visible light reflected from the coated side of about 4.5%, a visible light reflectance of the uncoated side of about 24.8%, and a solar radiation transmittance of about 30.0%.

Then, a $TiO_2$-$SiO_2$ thin layer was formed on the cobalt oxide layer, as follows. At first, an alkoxide mixture was prepared by mixing a titanium alkoxide with a silicon alkoxide in a molar ratio of $TiO_2$ to $SiO_2$ of 16:84 on an oxide basis. Then, the alkoxide mixture was mixed with an organic solvent mixture containing a main component of isopropyl alcohol, ethanol and n-butanol, and small amounts of water and a catalyst (hydrochloric acid), thereby to prepare an alkoxide mixture solution having a viscosity of 3.5 centipoises and a solute concentration of 3.5 wt% based on the total weight of $TiO_2$ and $SiO_2$. This alkoxide mixture solution was applied to the cobalt oxide layer, thereby to form thereon a sol film. Then, the coated glass plate was heated at about 250° C. for about 10 min, thereby to transform the sol film into a gel film. Then, the coated glass plate was put into a furnace heated at about 600° C., for 5 min., thereby to form a $TiO_2$-$SiO_2$ thin layer (non-light-absorbent second layer) on the cobalt oxide layer. The $TiO_2$-$SiO_2$ layer was found by the same measurement as that of Example 1 to have a thickness of about 75 nm and a refractive index of about 1.55, and further was found to have an extinction coefficient of up to about 0.03.

The obtained glass pane having the two-layered film on the vehicular interior side was subjected to the same optical characteristics measurement as that of Example 1. By this measurement, it was found to have a solar radiation transmittance of about 40%, and the other results are shown in Table. The glass pane had a pale-blue color tone, which was not so sensible to the human eye.

Furthermore, the glass pane was evaluated with respect to the outward and inward visibilities, in the same manners as those of Example 1. The results are shown in Table. Moreover, the glass pane was subjected to the surface resistivity measurement. By this measurement, it was found to have a sufficient radio transmissivity. Furthermore, the glass pane was subjected to the durability tests in the same manners as those of Example 1. All of the results of these durability tests were satisfactory.

EXAMPLE 3

In this example, Example 2 was slightly modified, as follows. A $TiO_2$-$SiO_2$ thin layer was formed on the cobalt oxide layer in the same manner as that of Example 2, except in that an alkoxide mixture was prepared by mixing the titanium alkoxide with the silicon alkoxide in a molar ratio of $TiO_2$ to $SiO_2$ of 38:62 on an oxide basis. The $TiO_2$-$SiO_2$ layer was found by the same measurement as that of Example 1 to have a thickness of about 65 nm and a refractive index of about 1.70, and further was found to have an extinction coefficient of up to about 0.03.

By the optical characteristics measurement, it was found to have a solar radiation transmittance of about 40%, and the other results of this measurement are shown in Table. The glass pane had a pale-blue color tone, which was not so sensible to the human eye. Furthermore, the glass pane was evaluated with respect to the inward and outward visibilities, in the same manners as those of Example 1. The results are shown in Table.

By the surface resistivity measurement, the glass pane was found to have a sufficient radio transmissivity. Furthermore, all of the results of the durability tests were satisfactory.

EXAMPLE 4

In this example, there was prepared a glass pane having a three-layered film (i.e., one light-absorbent layer and two non-light-absorbent layers) on the vehicular interior side, as follows.

At first, a cobalt oxide thin layer (light-absorbent layer) was formed on a green glass plate which is the same as that of Example 1, in the same manner as that of Example 1. Then, there was formed on the cobalt oxide layer a $TiO_2$ thin layer (non-light-absorbent layer) having a refractive index of about 2.25 and a thickness of about 65 nm. Then, there was formed on this $TiO_2$ layer a $SiO_2$ thin layer (non-light-absorbent layer) having a refractive index of about 1.45 and a thickness of about 95 nm. The thus coated glass plate was shaped into a vehicular rear window glass pane. Then, this glass pane was subjected to the same optical characteristics measurement as that of Example 1. By this measurement, it was found to have a solar radiation transmittance of about 40%, and the other results are shown in Table 1. The glass pane had a pale-blue color tone, which was not so sensible to the human eye. Furthermore, the glass pane was evaluated with respect to the inward and outward visibilities, in the same manners as those of Example 1. The results are shown in Table.

By the surface resistivity measurement as that of Example 1, the glass pane was found to have a sufficient radio transmissivity. By the durability tests as those of Example 1, the glass pane was found to be satisfactory in all of the durability tests.

EXAMPLE 5

In this example, there was prepared a glass pane having a two-layered film on the vehicular exterior side, as follows. At first, a titanium-containing solution was prepared by dissolving 150 g of titanium acetylacetonato in 1 liter of a solvent mixture prepared by mixing isopropyl alcohol, octylene glycol and methylene chloride. Then, this titanium-containing solution was sprayed at a rate of about 2,000 g/min onto a vehicular green-colored float glass plate NF14 which had just come out under a heated condition from a tin bath of the glass production line, thereby to form thereon a titanium oxide thin layer (non-light-absorbent layer) by pyrolysis method. The glass plate had a width of about 3.5 m, a thickness of 4.0 mm and a visible light transmittance of about 80%. The titanium oxide layer was found by the same measurement as that of Example 1 to have a thickness of about 60 nm and a refractive index of about 2.25, and further was found to have an extinction coefficient of up to about 0.03.

Then, the obtained coated glass plate was heated again to about 600° C., and then the cobalt-containing solution of Example 2 was sprayed at a rate of about 200 g/m² onto the tin oxide layer, thereby to form thereon a cobalt oxide thin layer (light-absorbent layer) by pyrolysis method. The cobalt oxide layer was found by the same measurement as that of Example 1 to have a thickness of about 40 nm and a refractive index of 2.78.

Then, the obtained coated glass plate was shaped into a vehicular rear window glass pane having the two-layered film disposed on the vehicular exterior side. Then, the glass pane was subjected to the same optical characteristics measurement as that of Example 1. By this measurement, the glass pane was found to have a solar radiation transmittance of about 40%, and the other results of the measurement are shown in Table. A reflected light from the glass pane had a color tone of pale blue, which was not so sensible to the human eye. A light reflected from the inner major surface of the glass pane had an excitation purity of about 17.8%. Furthermore, the glass pane was evaluated with respect to the inward and outward visibilities, in the same manners as those of Example 1. The results are shown in Table.

By the surface resistivity measurement as that of Example 1, the glass pane was found to have a sufficient radio transmissivity. By the durability tests as those of Example 1, the glass pane was found to be satisfactory in all of the durability tests.

COMPARATIVE EXAMPLE 1

In this comparative example, Example 1 was substantially repeated as follows, except in that the formation of the aluminum oxide layer (second layer) was omitted. In other words, there was prepared a glass pane having a one-layered film (light-absorbent layer) disposed on the vehicular interior side.

At first, a cobalt oxide thin layer was formed on a glass plate which is the same as that of Example 1, in the same manner as that of Example 1. This cobalt oxide layer was found by the same measurement as that of Example 1 to have a thickness of about 40nm and a refractive index of about 2.78, and further was found to have an extinction coefficient of about 0.64.

Then, the obtained coated glass plate (glass pane) was subjected to the same optical characteristics measurement as that of Example 1. The results are shown in Table. Furthermore, the glass pane was evaluated with respect to the inward and outward visibilities, in the same manners as those of Example 1. The results are shown in Table.

COMPARATIVE EXAMPLES 2–4

In these comparative examples, first, second and third colored films were respectively attached to the major inner surfaces of green-colored float glasses, each being the same as that of Example 1. Each of the first to third films had a gray color and a thickness of 0.1 mm and was made of polyester. The first, second and third films had transmittances of 29.1%, 71.5% and 50.0% and reflectances of 2.8%, 3.8% and 3.3%. The obtained coated glasses were subjected to the same optical characteristics measurement as that of Example 1. The results are shown in Table. Furthermore, the glass pane was evaluated with respect to the inward and outward visibilities, in the same manners as those of Example 1. The results are shown in Table.

The entire disclosure of each of Japanese Patent Application Nos. 8-198876 filed on Jul. 29, 1996 and 9-189914 filed on Jul. 15, 1997, including specification, claims and summary, is incorporated herein by reference in its entirety.

What is claimed is:

1. A vehicular glass pane having inner and outer major surfaces which are respectively disposed on a first side of a vehicular interior and a second side of a vehicular exterior, said glass pane comprising:

a glass plate containing a coloring agent and having inner and outer major surfaces which are respectively disposed on said first and second sides; and a multilayered film formed on one of said inner and outer major surfaces of said glass plate, said multilayered film including a first layer which is light-absorbent and a second layer which is non-light-absorbent, wherein said glass plate and said multilayered film are such that a visible light transmittance of said glass pane is from 25 to 55%, that a first reflectance of said inner major surface of said glass pane is up to 15%, that a second reflectance of said outer major surface of said glass pane is from 10 to 40%, that said visible light transmittance minus said first reflectance is at least 15%, and that said visible light transmittance minus said second reflectance is up to 30%.

2. A glass pane according to claim 1, wherein said second reflectance of said outer major surface of said glass pane is from 10 to 30%.

3. A glass pane according to claim 1, wherein said first reflectance of said inner major surface of said glass pane is from 3 to 15%, said second reflectance of said outer major surface of said glass pane is from 15 to 40%, said visible light transmittance minus said second reflectance is up to 15%, and a light reflected from said inner major surface of said glass pane has an excitation purity of from 4 to 20%.

4. A glass pane according to claim 1, wherein said multilayered film has said first layer formed on said inner major surface of said glass plate and said second layer formed on said first layer, such that said second layer is interposed between said first layer and an air of said vehicular interior.

5. A glass pane according to claim 1, wherein said multilayered film has said second layer formed on said outer major surface of said glass plate and said first layer formed on said second layer, such that said second layer is interposed between said first layer and said glass plate.

6. A glass pane according to claim 4, wherein said multilayered film has a third layer which is non-light-absorbent and is formed on said second layer, wherein said first, second and third layers respectively have first, second and third refractive indexes which are arranged in descending order.

7. A glass pane according to claim 1, wherein said visible light transmittance minus said first reflectance is at least 20%.

8. A glass pane according to claim 1, wherein said first reflectance is from 2 to 10%.

9. A glass pane according to claim 1, wherein said glass plate has a visible light transmittance of about 80%.

10. A glass pane according to claim 1, wherein said first layer is made of at least one selected from the group consisting of cobalt oxide, $Fe_2O_3$, $Cr_2O_3$, NiO, TiN, ZrN, TaN, and mixtures of at least two of these.

11. A glass pane according to claim 1, wherein said second layer is made of at least one selected from the group consisting of $SiO_2$, $Al_2O_3$, $TiO_2$, $SnO_2$, $ZrO_2$, and mixtures of at least two of these.

12. A glass pane according to claim 4, wherein said second layer has a refractive index which is lower than that of said first layer.

13. A glass pane according to claim 5, wherein said second layer has a refractive index which is intermediate between those of said glass plate and said first layer.

14. A glass pane according to claim 1, wherein said first and second layers have a first extinction coefficient of from about 0.2 to about 1.5 and a second extinction coefficient of up to about 0.03, respectively.

* * * * *